Sept. 17, 1940.    A. P. BALL    2,214,918
GARNISH MOLDING RETAINER
Filed Aug. 15, 1938
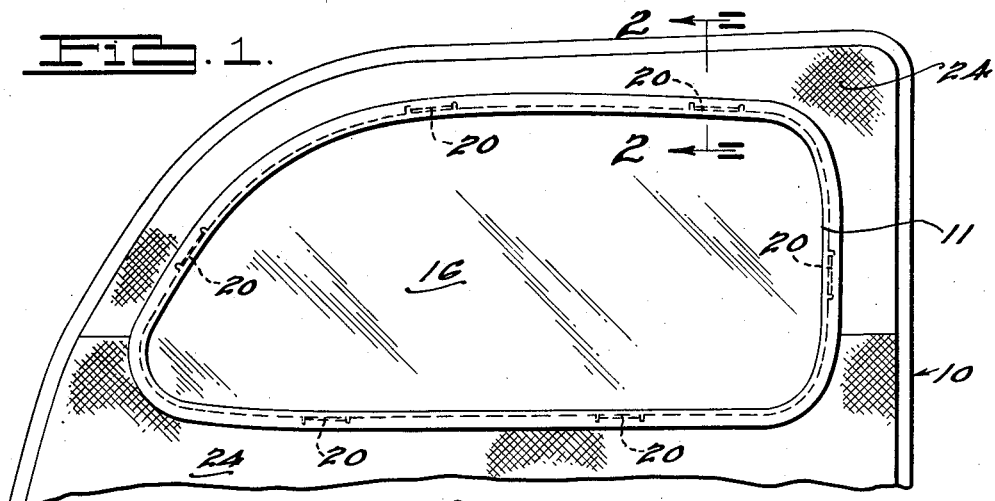
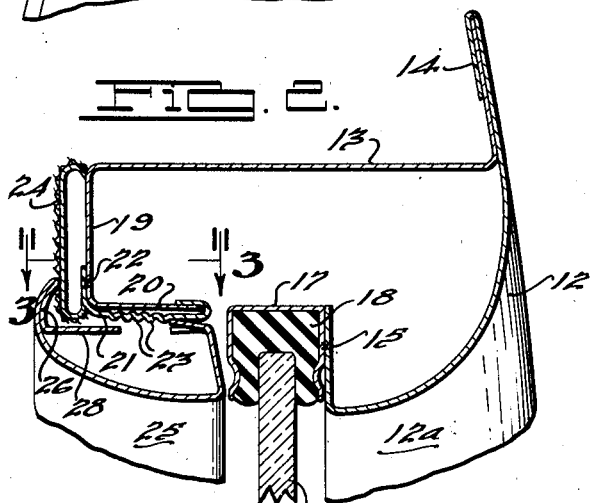
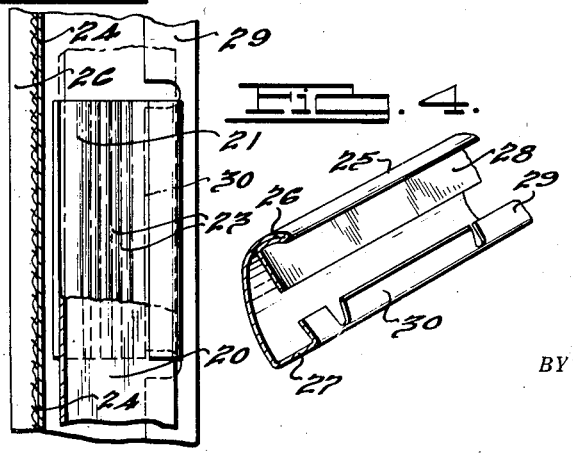
INVENTOR
Albert P. Ball.
BY Dike, Calver & Gray
ATTORNEYS.

Patented Sept. 17, 1940

2,214,918

UNITED STATES PATENT OFFICE 2,214,918

GARNISH MOLDING RETAINER

Albert P. Ball, Detroit, Mich., assignor to Briggs Manufacturing Company, Detroit, Mich., a corporation of Michigan Application August 15, 1938, Serial No. 224,861

2 Claims. (Cl. 296—44)

The present invention relates generally to garnish moldings or the like and to means for retaining such moldings or similar skeleton type frames within openings such as the window openings of automobile or other vehicle bodies. More particularly the invention relates to self-operating means for securing a molding formed preferably into a closed figure shaped and dimensioned to fit a given window opening in a vehicle or automobile body, which means automatically fixes the molding in place on the insertion thereof in the said opening.

Heretofore, various methods have been used or proposed for securing garnish or interior finish moldings within the margins of window openings of automobile bodies. Screws passing through the molding and engaging nuts or screw bosses on the window frame have largely been utilized. This method has been objectionable owing to the time, expense and difficulties involved in applying the screws and the unsightly appearance of the molding especially in cases where the exposed heads of the screws tarnish or become rusty. Suggestions have also been made for providing concealed fasteners to permit the molding to be sprung or snapped into place, none of which having proved successful, particularly on account of their impractical nature.

A principal object of the invention is to overcome disadvantages of previous molding retaining means and to provide an improved concealed means for retaining the molding firmly in place, which means is so constructed as to permit assembly of the molding by merely inserting it within the window opening and exerting pressure to snap it into place.

A further object of the invention is to provide an improved garnish molding retainer means of the concealed resilient member or yieldable clip type that permits easy and quick installation of the molding.

Another object is to provide a concealed retainer means for garnish moldings or similar skeleton frames of the closed figure type permitting easy installation while at the same time eliminating the necessity for screws or similar extraneous fastening elements.

Still another object of the invention is to provide improved fastening means for securing moldings or the like, made in the form of a closed figure, in an opening into which they are insertable, which means includes a portion of the frame defining the opening.

Other objects of this invention will appear in the following description and appended claims, reference being had to the accompanying drawing forming a part of this specification wherein like reference characters designate corresponding parts in the several views.

Fig. 1 is a fragmentary side elevation of an automobile door embodying one form of the present invention.

Fig. 2 is an enlarged vertical section of the form of the invention depicted in Fig. 1, taken substantially through lines 2—2 of Fig. 1, looking in the direction of the arrows.

Fig. 3 is a fragmentary longitudinal section of the embodiment of the invention shown in Figs. 1 and 2 taken along the lines 3—3 of Fig. 2 in the direction of the arrows.

Fig. 4 is a fragmentary view in perspective showing the structure of the garnish molding utilized in the present invention.

Before explaining in detail the present invention it is to be understood that the invention is not limited in its application to the deails of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring to the drawing and in particular to Figs. 1 to 3 inclusive, there is illustrated, by way of example, a preferred embodiment of the invention as applied to a garnish molding together with portions of a vehicle body frame. This embodiment adapts the said molding to be secured within and around the marginal edges of the window opening of an automobile body. Although the invention is shown as applied to the door of an automobile body, it will be understood that the invention is applicable to all windows or similar openings of automobile or other vehicle bodies.

There is shown at 10 a vehicle door having a window frame defining the window opening 11. The window frame is formed through the medium of an outer body panel 12 and inner pressed metal framing members including the header of the window frame which is shown by way of example at 13 in Fig. 2. This header 13 is secured to the outer panel 12 by an overlapping flange structure or equivalent means as clearly indicated at 14. The outer panel 12 is pressed to provide a window reveal 12a terminating in an angular flanging 15 forming in part the marginal housing for the window glass or closure 16 of the window opening 11. The flanging 15 carries a channel-shaped window retainer 17 which is fixed thereto as by spot welding or the like and which also constitutes a part of the marginal housing for the closure 16. This channel member 17 contains a lining or inner pad 18 of felt or other insulating and cushioning material so as to provide an end stop for the said closure.

As shown in Fig. 2, the header 13 terminates at the inner side of the door 10 in a downward substantially vertically extending marginal flange 19. The flanging 19 preferably extends continuously around the inner edge of the window frame, but at predetermined intervals thereupon an additional flange or tongue 20 is integrally formed therewith and extends outwardly, that is, in the direction of the outer body panel 12, as shown. As may be noted from a consideration of the drawing, the tongue 20 is disposed below and substantially parallel to the main or laterally extending portion of the header 13, and, moreover, forms a continuation of the latter as well as of the flange 19. The tongue 20 may be formed by providing an extending piece of metal on the flange 19 at the point predetermined for the location of the said tongue and thereafter bending this extension into the position described above. While the structure mentioned is distinctly preferable, it will be readily understood that other suitable ways of fixing the tongue 20 to the flange 19 are available, such for example, as spot welding separately formed tongue 20 thereto. As this tongue 20 forms a part of my molding fastening means, it will be appreciated that the number and location thereof is a matter of choice and is determined in a manner suitable for the type of molding and vehicle body in question. In the form of the invention depicted in the drawing, six such fastening means are utilized as indicated by the numerals 20, 20 of Fig. 1.

To the underside of the tongue 20 is secured an additional outwardly extending tongue or retainer piece 21 which possesses an upwardly bent portion at its inner or trim strip facing end. This portion is fixed to the face of the flange 19 by spot welding or other suitable means as indicated at 22 (Fig. 2). The opposite, that is, the outer end of the tongue 21 is secured to the inner or free end of the flange 20 of the header 13 by being turned over the lateral edge thereof and pinned in place in the manner clearly shown in Fig. 2. The intermediate portion of the tongue 21, lying between the two turned ends thereof and beneath the flange 20, contains corrugations or crimps as shown at 23. As both the flange 20 and the tongue 21 are formed from sheet metal, such as sheet steel, they are yieldable and resilient in nature and therefore constitute a pair of spaced inwardly turned tongues forming a single unified and springy molding retainer flange.

The inner face of the door frame is finished by means of fabric covered trim paneling 24 which conceals the marginal flange 19 around the window opening. In the present instance, the trim paneling on the inner face of the door frame comprises a foundation strip or sheet of relatively stiff flexible material, such as thin sheet metal or fiberboard, the former being shown in Fig. 2. This foundation strip or sheet may be covered with a layer of suitable trim fabric.

The garnish molding of the present embodiment is designated by the reference character 25 and is depicted in particular in Fig. 4. This molding, as there shown, is a continuous generally channel-shaped metal member forming a closed figure shaped to fit within the margin of the window opening. The molding may vary materially in cross section, but is preferably in the form of a metal strip rolled to produce a channel. In the present instance, the molding 25 has an intermediate curved web portion terminating in a continuous curled inner flange or lip 26 and an outer flange 27 turned at approximately a 90° angle. The metal along the free edge of the lip 26 continues and is turned in towards the channel of the molding doubling back along the inner surface of the said lip portion to form therewith two layers of material lying in superimposed relationship as clearly shown in Fig. 4. The inner one of the said pair of layers is turned upwardly, that is, away from the web portion of the molding, to provide a flange 28. The flange 27 is turned inwardly, that is, toward the flange 28 and lies in substantially the same lateral plane therewith. Such a structure provides an additional flange 29 from which an inclined slightly yieldable portion 30 is struck out at intervals, as shown in Fig. 4. The molding 25 is so designed that this inclined portion 30 is formed to register with the tongue 20 and, consequently, the intervals mentioned are suitably disposed in occurrence and position so that each tongue 20 may operate with one portion 30. It will be noted in view of the foregoing, that the molding 25 is hollow in form with the flanges 28 and 29 cooperating with the web portion thereof to provide its inner space or channel as well as being separated along their longitudinal edges to provide a continuous longitudinal slot leading thereinto as illustrated in Fig. 4.

The molding 25 is of the snap-on type and in assembling the same with respect to the frame 10 of the vehicle body, the molding is slid into the opening 11 within that frame in the direction of the window 16. When the molding 25 in its movement toward the said window meets the corrugations 23 of the tongue 21, the said tongue as well as its support 20 is caused to flex upwardly, since the forward edge of the flange 29 and more particularly the inclined portion 30 thereof rides over the surface of the corrugations and pushes against them. As this movement continues the flange 29 and the inclined portion 30 thereof ride off the corrugations 23 and by virtue of the inherent resilience of the tongues 26 and 27 these members snap downwardly, as a result of which the corrugations 23 are caused to engage the flange 29 at its inclined portion 30 as clearly indicated in Fig. 2. It will be observed that this inclined portion 30 presents a relatively abrupt shoulder holding the molding 25 firmly in place in the frame 10. It will also be noted that upon reaching its installed position the lip portion 26 of the molding 25 contacts the trim strip 24 as shown. Consequently, the present fastening means holds the molding in position by exerting a wedging action through applying a continuously effective yielding pressure pressing the molding toward the window and holding it between the corrugations 23 and the trim covered face of the flange 19. The arrangement described avoids the use of extraneous fasteners of any kind and enables the assembly of the moldings with respect to the frame within which they fit to be brought about by the simple manual operation of insertion. At the same time the fastening means is completely concealed by the molding.

I claim:

1. In a garnish molding assembly for a vehicle body frame having substantially vertical marginal flanging defining a window opening, a plurality of resilient flanges turned outwardly at pre-selected locations from said marginal flanging, an irregularly surfaced resilient piece positioned on the side of each of the said turned flanges which faces the opening, said resilient piece being fixed in place by being secured at its opposite ends respectively to the said marginal flanging and to the free end of the turned flange, and an open figured molding or skeleton frame possessing a continuous internal flanging from which a plurality of resilient inclined projections have been struck, each of which is positioned to register with one of the said fixed resilient pieces as well as to engage the aforesaid irregular surface thereof on assembly whereby the said molding or frame is removably maintained in place.

2. In a garnish molding assembly for a vehicle body frame having substantially vertical marginal flanging defining a window opening, a plurality of resilient flanges turned outwardly at pre-selected locations from said marginal flanging, a resilient piece having a corrugated surface and being positioned on the side of each of the said turned flanges which faces the opening, said piece being fixed in place by being welded at its inner end to the inner face of the said marginal flanging and at its outer end by being crimped about the outwardly extending free end of the said turned flange, and an open figured molding possessing a continuous internal flanging from which a plurality of resilient inclined projections have been struck, each of which is positioned to register with one of the said fixed resilient pieces as well as to engage the aforesaid corrugated surface thereof on assembly whereby the said molding is removably maintained in place.

ALBERT P. BALL.